United States Patent [19]

Knowles

[11] Patent Number: 4,484,384

[45] Date of Patent: Nov. 27, 1984

[54] HAND OPERATED FITTING SWAGER

[75] Inventor: Steven M. Knowles, Jackson, Mich.

[73] Assignee: Aeroquip Corporation, Jackson, Mich.

[21] Appl. No.: 443,542

[22] Filed: Nov. 22, 1982

[51] Int. Cl.³ .............................................. B23P 19/02
[52] U.S. Cl. ........................................ 29/237; 29/263
[58] Field of Search ................. 29/237, 251, 256, 258, 29/282, 283, 238; 269/244; 81/170

[56] References Cited

U.S. PATENT DOCUMENTS

| | | | |
|---|---|---|---|
| 529,957 | 11/1894 | Rogers | 81/170 |
| 566,299 | 8/1896 | Downey et al. | 81/170 |
| 4,033,022 | 7/1977 | Currie et al. | 29/237 |

Primary Examiner—James L. Jones, Jr.
Attorney, Agent, or Firm—Beaman & Beaman

[57] ABSTRACT

The invention pertains to a hand operated swager for attaching swaged end fittings to flexible hose. The apparatus includes an elongated frame having a screw rotatably supported at one end thereof and restrained against axial movement. An adapter cooperates with the screw through a ball nut mounted upon the adapter wherein the adapter is linearly displaceable upon the frame toward and away from a frame mounted swaging die. The linear axial displacement between the adapter and screw is accommodated within the adapter permitting power means to be applied to the screw, if desired.

3 Claims, 3 Drawing Figures

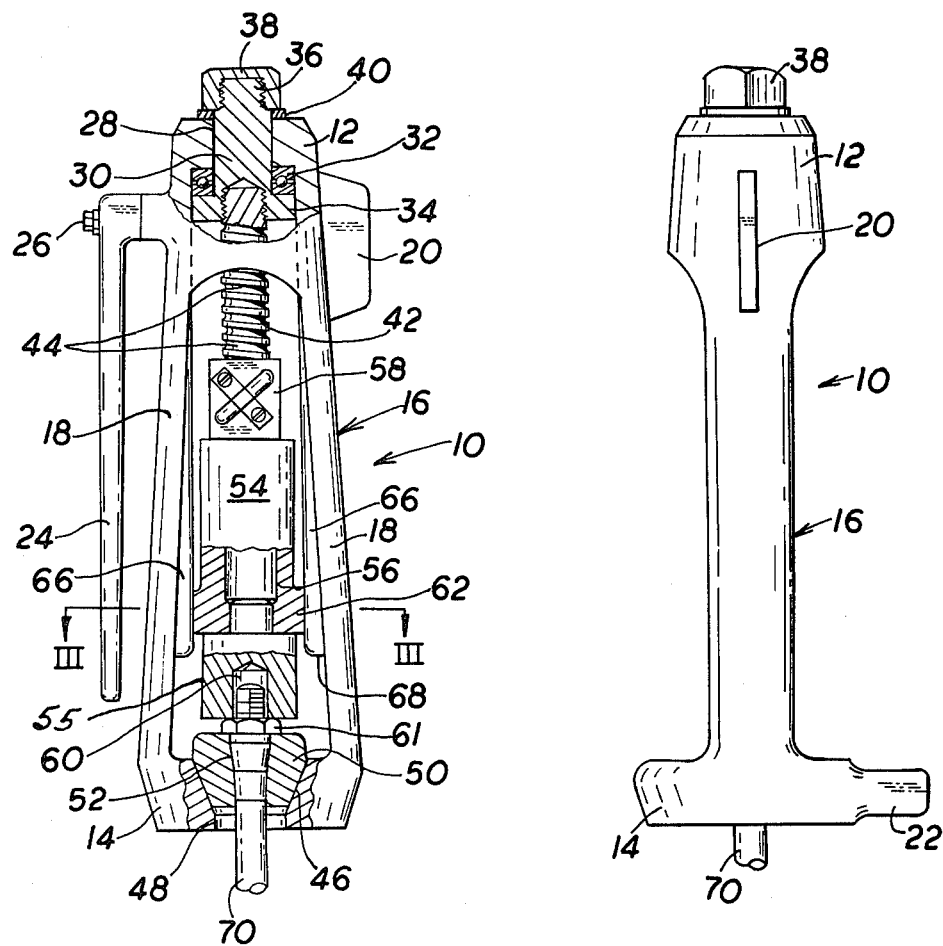
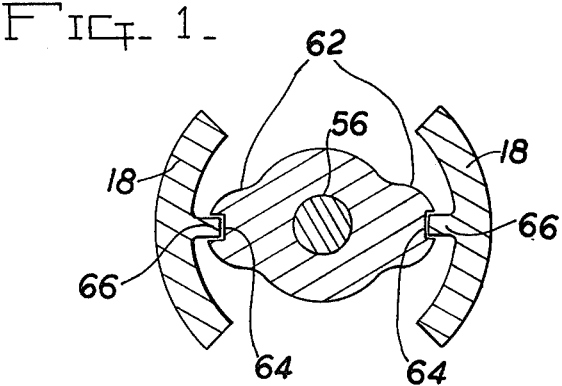

HAND OPERATED FITTING SWAGER

BACKGROUND OF THE INVENTION

Fittings for flexible hose utilizing a swaged collar are usually assembled to the hose at the factory, or by a hose distributor, and such assemblers utilize power equipment for swaging the hose fitting components upon the hose. However, there is often a need to assemble a swaged fitting upon a hose at the site of use, or by the direct user, such as a farmer or construction worker, and small manually operated hose fitting swagers have long been available for such use. Typical manual swaging apparatus is shown in U.S. Pat. Nos. 3,785,050; 3,858,298 and its reissue patents U.S. Pat. Nos. Re 29,801 and Re. 29,802; and U.S. Pat. No. 4,033,022.

As significant forces are required to swage the fitting component it is known to use manually operated hydraulic jacks or screws to produce the necessary forces. For instance, in the above identified patents screws are utilized in conjunction with anti-friction ball nut devices to produce the necessary force with a minimum of friction in order to reduce the manual effort required during the swaging operation.

Small portable swagers of the known type may be mounted within a workbench vise during use, or on a support surface, or may remain unsupported and are often provided with an anti-torque handle for such usage. However, a small power operated swager which is economically practical for consumer use has not heretofore become available, and the construction of prior art swagers is such as to render the electric powering of such devices very difficult.

It is an object of the invention to provide a manual swager for fittings for flexible hose wherein the swager uses a screw actuator which is axially fixed.

Another object of the invention is to provide a manually operated hose fitting swager which may be power driven without requiring modification.

An additional object of the invention is to produce a portable swaging apparatus for assembling swaged fittings to flexible hose wherein the swager utilizes a screw threadedly cooperating with an adapter, and the adapter encompasses the screw during use.

In the practice of the invention an elongated frame includes first and second ends. At one end a swaging die is located, and a screw is rotatably mounted at the other frame end. The bearing support for the screw permits the screw to rotate, but the screw is prevented from being displaced in an axial direction.

The central region of the frame includes linear tracks or guides, and an adapter threadedly associated with the screw through a ball nut slidingly cooperates with the frame track wherein the adapter is capable of linear movement toward and away from the swaging die, but is restrained against rotation. The adapter is of a tubular configuration and receives the screw at all positions of the adapter.

The adapter includes a fitting receiving recess in opposed relationship to the swaging die, and a fitting received within the adapter recess is translated toward the die upon rotation of the screw passing that portion of the fitting through the die which requires swaging.

The upper end of the screw includes a drive head, usually of hexagonal form, whereby a wrench may be applied to the head for rotating the screw. However, as the screw and head are not axially displaced during operation, power means such as an electric drill or torque wrench may be applied to the screw head for power operation of the swager.

BRIEF DESCRIPTION OF THE DRAWINGS

The aforementioned objects and advantages of the invention will be appreciated from the following description and accompanying drawings wherein:

FIG. 1 is an elevational front, partially sectioned view of the swager in accord with the invention illustrating the relation of the components at the termination of swaging, FIG. 2 is an elevational view as taken from the right of FIG. 1, and FIG. 3 is a plan sectional view through the adapter and frame as taken along Section III—III of FIG. 1.

BRIEF DESCRIPTION OF THE PREFERRED EMBODIMENT

With reference to FIGS. 1 and 2, the swager of the invention includes an elongated cast metal frame 10 having an upper end 12, a lower end 14 and a central region 16 defined by a pair of spaced columns 18. The frame includes an outwardly extending tang 20 wherein the frame may be held within the jaws of a vise, and at the lower end the frame includes an outwardly extending mounting pad 22 having bolt holes wherein the frame can be mounted upon the edge of a table, or other supporting surface. Further, the frame includes an anti-torque arm handle 24 pivotally affixed to the frame by pivot screw 26, wherein the handle may be pivoted upwardly 90° from the position shown in FIG. 1 and grasped to resist torque imposed upon the frame during manual rotation of the screw, as later described.

At the upper end 12, the frame includes a cylindrical bore 28 which rotatably receives the screw head 30. The screw head includes a cylindrical body rotatably supported within the bore 28 by a thrust bearing 32 interposed between the head flange 34 and the frame end 12. At its upper end, the head 30 includes a threaded stud 36 upon which the hexagonal cap 38 is threaded, and annular thrust bearing washer 40 is located between the frame end and the hexagonal cap.

An elongated threaded shaft or screw 42 threads into the head 30 for rotation with the head, and the screw 42 is provided with spiral ball receiving grooves 44 for cooperation with the balls of the adapter ball nut, as later described.

The lower end of the frame 10 is provided with a conical bore 46 which merges with a cylindrical bore 48, both of which are coaxial with the screw 42 and head 30. A pair of split swaging dies 50 are located within the conical bore 46, and the swaging dies include swaging bore surfaces 52, FIG. 1, for performing the swaging operation. The particular configuration of the swaging dies 50 forms no part of the instant invention and such apparatus is well known as used with manual swagers as described in the aforementioned patents. If desired, retaining means, not shown, may be mounted upon the frame for retaining the dies 50 within the conical bore 46. Various sizes of dies may be readily substituted for each other to accommodate different sizes of fittings.

Two part adapter 54 generally of cylindrical exterior configuration, is located at the central region 16 of the frame and at its upper part includes an internal bore 56 in alignment with the screw 42 and is adapted to receive the screw during operation of the swager. At the upper end of the adapter a conventional anti-friction ball nut 58 is affixed, and the balls thereof are received within the grooves 44 of the screw shaft whereby rotation of the screw shaft will translate the adapter 54 toward and away from the dies 50 depending on the direction of screw rotation.

The lower end of the adapter 54, at changeable portion 55, is provided with a recess 60 for receiving the hose fitting 61 in the known manner, and the particular size and configuration of the adapter recess and engaging surfaces will be determined by the type of fittings being assembled.

The adapter includes a pair of radially extending projections or embossments 62, FIG. 3, in diametrically opposed relationship to each other, each embossment having a U-shaped recess 64 defined therein. Each frame column 18 is internally provided with a linear track or guide 66 radially projecting inward of the associated columns, and as will be appreciated from FIG. 3, each track 66 is received within an adapter recess 64 whereby the adapter will readily move toward and away from the swaging dies 50, and is prevented from rotating about the adapter axis.

As will be noted in FIG. 1, the tracks 66 terminate at 68 short of the lower end 14 in order to permit the adapter to be properly assembled with the column tracks.

In operation, a wrench is applied to the hexagonal or square cap 38, and the screw is rotated to draw the adapter 54 toward the upper end 12. In the uppermost position of the adapter sufficient clearance exists below the adapter lower end to permit a fitting 61 to be inserted upwardly through the bore 48 after the die halves 50 have been removed from the die bore 46 and the fitting swaging collar has been placed upon the exterior of the hose 70 adjacent the fitting. Thereupon, the die halves 50 are installed in the bore 46 and the fitting 61 is received within the adapter recess 60. The operator then rotates the screw 42 by means of the wrench placed upon cap 38, and the screw is rotated to translate the adapter toward the frame lower end 14. This action is continued until the fitting collar is fully pushed through swaging die bore 52 to swage the collar upon the hose and complete the fitting and hose assembly. At this time the components will be as illustrated in FIG. 1.

Thereupon, the operator reverses the direction of rotation of the screw 42, raising the adapter 54 from the fitting 61, the split dies 50 are removed from the conical bore 46 and cleared from the bore and the hose and fitting are withdrawn from the lower end of the frame.

During such swaging operation, the frame 10 may be mounted within a vise by means of the tang 20, the frame may be mounted upon the edge of a table by means of pad 22, or, by the operator grasping the anti-torque handle 24 while tightening the screw 42, the operation may be accomplished without a vise or supporting table.

As the screw 42 and screw head 30 are restrained against axial movement during rotation of the screw, power equipment can readily be utilized with the described apparatus for rotating the screw. For instance, an electric drill, not shown, having a socket may be easily placed upon the cap 38 for electrically powering the screw, or, an electric or air operated power wrench socket, not shown, may be placed upon the screw cap 38. Thus, it will be appreciated that the disclosed construction permits power operation with conventionally available tools without modification.

Also, as the screw 42 is telescopingly received within the adapter bore 56 during use, the screw is protected from foreign matter and the like, and the apparatus may be stored with the adapter in its uppermost position nearest end 12 which will tend to protect the screw threads during storage.

It is appreciated that various modifications to the invention may be apparent to those skilled in the art without departing from the spirit and scope of the invention.

I claim:

1. A swaging tool for affixing a fitting to a hose comprising, in combination, a frame having a first end, a second end, and a central region intermediate said ends, a swaging die support mounted within said frame second end having an axis, an elongated screw rotatably mounted upon said frame first end extending toward said second end having an axis coincident with said die support axis, said screw having an outer end extending from said frame first end and an inner end located within said frame central region, thrust bearing means mounted upon said frame first end adjacent said screw outer end rotatably supporting said screw and fixing said screw against axial displacement, screw rotating means defined on said screw outer end, an adapter movably mounted upon said frame at said central region, said adapter comprising an elongated tubular member having a nut mounting end disposed toward said frame first end, linear first guide means defined on said frame at said central region substantially parallel to said axis of said die support and screw, second guide means defined on said adapter slidingly cooperating with said first guide means permitting linear movement of said adapter parallel to said die support axis and preventing rotation of said adapter relative to said axis, said adapter including a fitting receiving end disposed toward said die support, and threaded nut means defined on said adapter nut mounting end mating with said screw whereby rotation of said screw translates said adapter relative to said die support.

2. In a supporting tool as in claim 1, said threaded nut means comprising a ball nut having anti-friction balls and said screw includes a spiral thread groove receiving said balls.

3. In a supporting tool as in claim 1, said frame including spaced parallel columns defining said central region, said first guide means comprising an elongated track embossment defined on each column, and said second guide means comprising yokes defined on said adapter engaging said embossments.

* * * * *